May 20, 1952     A. I. FADER ET AL     2,597,627

CONTROLLED HEAT FLOW OVEN

Filed Nov. 27, 1946     2 SHEETS—SHEET 1

INVENTORS.
ARTHUR I. FADER
BY IRA NEVIN

ATTORNEY

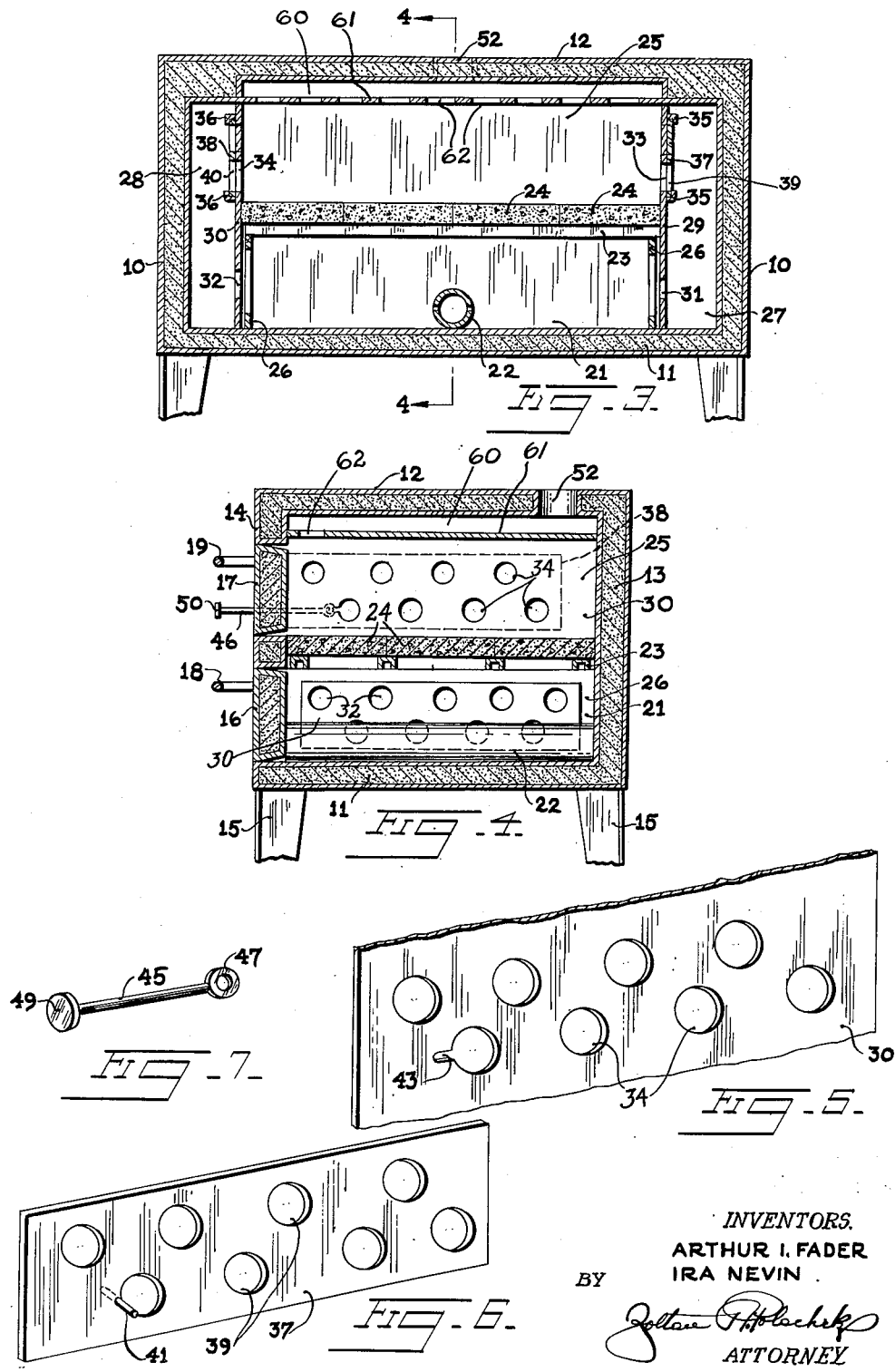

Patented May 20, 1952

2,597,627

UNITED STATES PATENT OFFICE 2,597,627

CONTROLLED HEAT FLOW OVEN

Arthur I. Fader, Yonkers, and Ira Nevin, Bronx, N. Y.

Application November 27, 1946, Serial No. 712,500

3 Claims. (Cl. 107—55)

1

The present invention relates to ovens and consists of the combination, construction and arrangement of parts herein described and claimed.

The invention comprises, briefly, an especially designed portable oven which is capable of baking pies known as "pizza," the baking of which pies presents the peculiar problem of needing a tremendously high amount of heat directed to their tops in order to bake them properly. The oven is, however, capable of use as an ordinary oven by a simple adjusting means.

It is accordingly an object of the invention to provide a portable oven capable of baking foodstuffs requiring a high amount of heat directed at their top portions.

Another object of the invention is the provision of novel means for regulating the direction and amount of heated air to be directed toward foodstuffs in the baking oven.

A further object of the invention is the provision of simple means for quickly and easily changing the character of the oven from one which directs a major portion of its heat to the top of foodstuffs in the oven to that of an ordinary oven.

Still another object of the invention is the provision of a device of this kind which is of simple and portable construction yet which is possessed of all of the advantages of a large "built in" type of oven.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a vertical sectional view taken substantially along line 3—3 of Fig. 2.

Fig. 4 is a vertical sectional view taken substantially along line 4—4 of Fig. 3.

Figs. 5, 6 and 7 are perspective views disclosing certain details of construction utilized in the invention.

Figure 1:
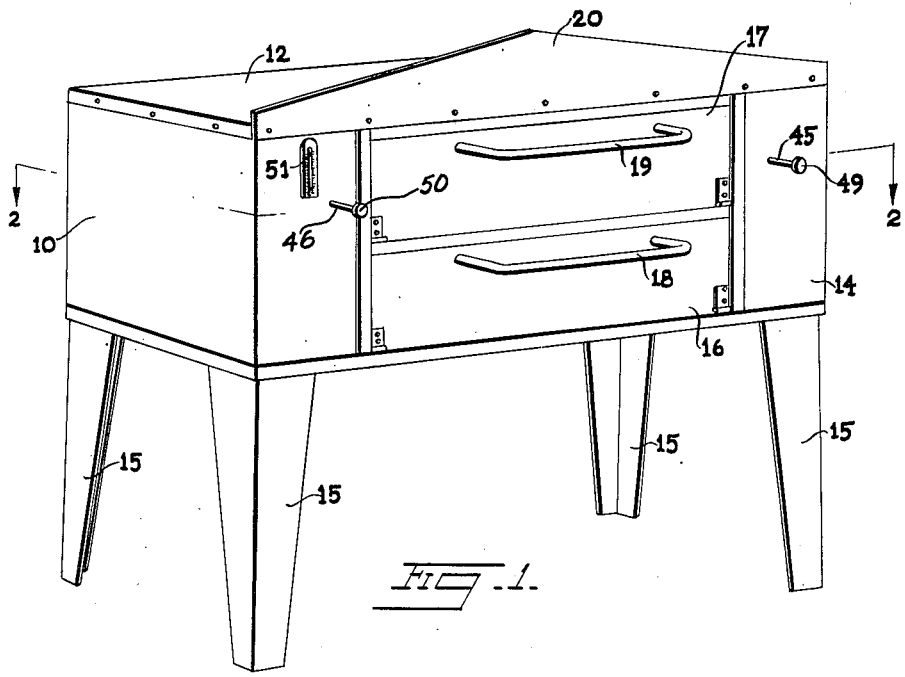
Fig. 1 is a perspective view of the oven constructed in accordance with the present invention.
Figure 2:
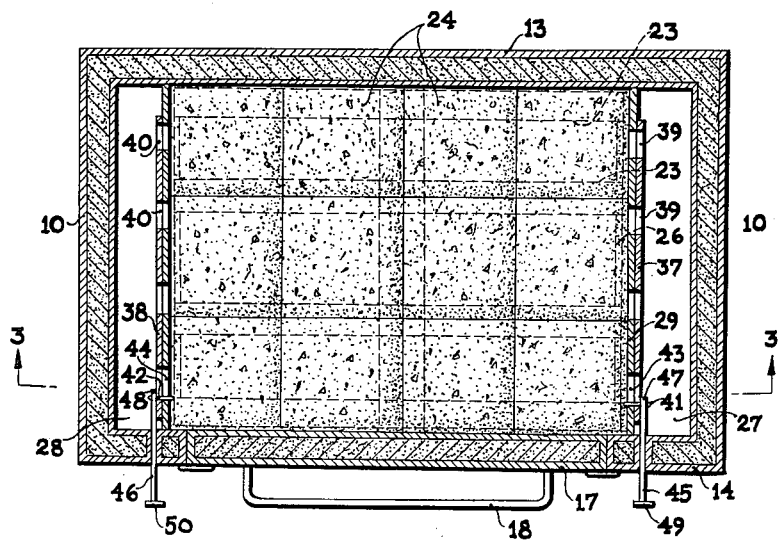
Fig. 2 is a horizontal sectional view, in plan, taken along line 2—2 of Fig. 1.

Referring more particularly to the drawings, there is shown a portable oven including a housing having insulated sides 10, bottom 11, top 12, back 13 and front 14. Legs 15 are provided for support and doors 16 and 17 are horizontally mounted in the front of the oven being provided,

2 of course, with handles 18 and 19. An ornamental shield 20 is fastened along the upper edge of the front 14.

Within the oven there is provided a combustion chamber 21 having, preferably, a gas burner 22 and, above the combustion chamber, separated by a shelf 23 lined with fire brick 24 or the like, is an oven compartment 25. The shelf 23 is preferably formed of channel bars and is supported at either end by end plates 26.

Between the sides 10, the combustion chamber 21 and the oven compartment 25 are flues 27 and 28 formed on either side. The oven compartment 25 and combustion chamber 21 are provided with sidewalls 29 and 30 having openings 31 and 32 forming passages between the combustion chamber 21 and the flues 27 and 28 and vertically spaced rows of evenly spaced openings 33 and 34 forming passageways between the oven compartment 25 and the flues 27 and 28.

Slidably mounted in a horizontal position in brackets 35 and 36 are a pair of adjusting plates 37 and 38, each having vertical rows of evenly spaced openings 39 and 40 matching the spacing of the openings 33 and 34. The plates 37 and 38 each have a pin 41 or 42, respectively, which is adapted to protrude through slots 43 and 44, respectively, cut in the oven side walls 29 and 30.

Shafts 45 and 46 having rings 47 and 48 formed at one end and adapted to encircle the pins 41 and 42, protrude through the front 14 and terminate in operating handles 49 and 50, respectively. It will be seen that the openings 33 and 39 are adapted to be brought into registry by means of the handle 49 as are the openings 34 and 40 by means of the handle 50. A thermometer 51 may be mounted in the front of the device.

The inner face of the top wall 12 between the side walls 29 and 30 is recessed providing a discharge chamber 60. The bottom of the chamber 60 is closed by a wall 61 provided along its front edge with spaced holes 62 leading from the oven compartment 25 to the discharge chamber 60.

In operation, it will be apparent that when it is desired to bake pizza or like foodstuffs, the handles 49 and 50 are pushed rearwardly, whereupon the openings 33 and 39 and the openings 34 and 40 are caused to register. Heat will now pass through said openings and thereby be directed immediately upon the top of such foodstuffs before passing out through a chimney 52 mounted through the top wall 12 above the back of the discharge chamber 60.

If it is desired to bake in the ordinary manner, however, it is only necessary to move the handles 49 and 50 nearly completely rearwardly so as to move the plates 37 and 38 to a position in which their openings will be nearly completely disaligned with the openings 33 and 34 of the side walls of the oven compartment. This provides a reduced passage for the combustion gases from the flues 27 and 28 through the oven compartment and thence to the chimney 52.

The operation of the oven when baking pizza and the like Italian foodstuffs or when used for ordinary baking, is as follows:

The hot gases of combustion from the gas burner 22 pass from the combustion chamber 21 into the flues 27 and 28 through the openings 31 and 32 formed in the bottoms of the side walls 29 and 30. From the flues 27 and 28, the hot gases pass into the oven compartment 25 through the openings 33 and 39 in the wall 29 and respective plate 37 and through the openings 34 and 40 in the wall 30 and respective plate 38. The slots 43 and 44, engaged by the pins 41 and 42, are of such length that the plates 37 and 38 cannot be moved to positions completely disaligning the openings 33 and 39 and the openings 34 and 40. The slots 43 and 44 are of a length slightly less than the diameters of the openings so that when the pins are at one end of the slots the openings will be in complete alignment and when the pins are at the other ends of the slots the openings will only be nearly completely disaligned so that the hot gases can pass through those openings from the flues 27 and 28 into the oven compartment 25.

From the oven compartment 25, the gases of combustion exit to the atmosphere through the holes 62 in the front of the wall 61, through the discharge chamber 60, and, finally, through the chimney 52.

Rearward movement of the plates 37 and 38 is restricted by engagement of the pins 41 and 42 with the sides of the holes 33 and 34 remote from the associated slots 43 and 44.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:

1. A damper construction within an oven for controlling the passage of hot combustion gases from flues located on opposite sides of an oven compartment into that oven compartment, comprising vertical side walls dividing the flues from the oven compartment, said side walls having vertically spaced rows of evenly spaced openings, plates slidably supported on said side walls over said openings, said plates having vertically spaced rows of evenly spaced openings matching the spacing of the openings in said side walls, and means for sliding said plates in one direction or the other for aligning and nearly completely disaligning said openings of said plates and said openings of said side walls, said sliding means comprising pins extending from said plates, handles having shafts slidably extended through a wall of the oven, and rings on the inner ends of said shafts and engaged over said pins connecting said shafts to said plates.

2. A damper construction within an oven for controlling the passage of hot combustion gases from flues located on opposite sides of an oven compartment into that oven compartment, comprising vertical side walls dividing the flues from the oven compartment, said side walls having vertically spaced rows of evenly spaced openings, plates slidably supported on said side walls over said openings, said plates having vertically spaced rows of evenly spaced openings matching the spacing of the openings in said side walls, and means for sliding said plates in one direction or the other for aligning and nearly completely disaligning said openings of said plates and said openings of said side walls, said sliding means comprising pins extending from said plates, handles having shafts slidably extended through a wall of the oven, and rings on the inner ends of said shafts and engaged over said pins connecting said shafts to said plates, said pins having end portions extended toward the side walls, said side walls having elongated slots with their lengths extended in the direction in which said plates slide and into which said end portions of the pins are engaged limiting sliding of said plates in one direction or the other.

3. A damper construction within an oven for controlling the passage of hot combustion gases from flues located on opposite sides of an oven compartment into that oven compartment, comprising vertical side walls dividing the flues from the oven compartment, said side walls having vertically spaced rows of evenly spaced openings, plates slidably supported on said side walls over said openings, said plates having vertically spaced rows of evenly spaced openings matching the spacing of the openings in said side walls, and means for sliding said plates in one direction or the other for aligning and nearly completely disaligning said openings of said plates and said openings of said side walls, said sliding means comprising pins extending from said plates, handles having shafts slidably extended through a wall of the oven, and rings on the inner ends of said shafts and engaged over said pins connecting said shafts to said plates, said pins having end portions extended toward the side walls, said side walls having elongated slots with their lengths extended in the direction in which said plates slide and into which said end portions of the pins are engaged limiting sliding of said plates in one direction or the other, said slots being of a length slightly less than the diameter of said openings and formed in the side walls so that when said pins are at one end of said slots said openings are aligned and when said pins are at the other end of said slots said openings are nearly completely disaligned.

ARTHUR I. FADER.
IRA NEVIN.

REFERENCES CITED

The following references are of record in the file of this patent:

UNITED STATES PATENTS

| Number | Name | Date |
|---|---|---|
| 257,001 | Hall | Apr. 25, 1882 |
| 278,069 | Woodbury | May 22, 1883 |
| 645,093 | Hitchen | Mar. 13, 1900 |
| 954,385 | Ferger | Apr. 5, 1910 |
| 1,199,929 | Scheer | Oct. 3, 1916 |
| 1,428,063 | Schaller | Sept. 5, 1922 |
| 1,637,427 | Riches | Aug. 2, 1927 |
| 1,777,885 | Houlis | Oct. 7, 1930 |
| 1,854,034 | Hunter | Apr. 12, 1932 |
| 1,940,889 | Stephens | Dec. 26, 1933 |
| 2,201,801 | Stavrou | May 21, 1940 |
| 2,431,207 | Stephens | Nov. 18, 1947 |